United States Patent [19]
Linga et al.

[11] Patent Number: 6,042,801
[45] Date of Patent: Mar. 28, 2000

[54] METHOD FOR BAKING OR CALCINATION OF SHAPED CARBON BODIES IN A FURNACE

[75] Inventors: Hogne Linga; Arne Werge-Olsen; Lene Navestad Solli, all of Årdalstangen, Norway

[73] Assignee: Norsk Hydro A.S., Oslo, Norway

[21] Appl. No.: 08/766,610

[22] Filed: Dec. 13, 1996

[30] Foreign Application Priority Data

Dec. 15, 1995 [NO] Norway ..................................... 955092

[51] Int. Cl.⁷ ....................................................... D01F 9/12
[52] U.S. Cl. ..................................... 423/445 R; 423/477.1
[58] Field of Search ............................ 423/447.1, 445 R; 264/29.3; 23/314

[56] References Cited

U.S. PATENT DOCUMENTS

| 3,793,204 | 2/1974 | Ardary et al. | 423/448 |
| 5,137,755 | 8/1992 | Fujikawa et al. | 264/29.6 |
| 5,486,496 | 1/1996 | Talbert et al. | 501/90 |

FOREIGN PATENT DOCUMENTS 7-53623  6/1995  Japan .

Primary Examiner—Steven P. Griffin
Assistant Examiner—Stuart L. Hendrickson
Attorney, Agent, or Firm—Wenderoth, Lind & Ponack, L.L.P.

[57] ABSTRACT

The present invention concerns a method for baking or calcination of shaped carbon bodies in a furnace and a packing material for use in the same. In accordance with the method, carbon bodies are burned in a furnace chamber, supported or surrounded by a packing material which is formed from a mixture of a material containing carbon and particles of a material containing silicon oxide such as crushed chamotte stone. In accordance with the method, the baking of the carbon bodies will take place at a greater temperature gradient across the packing joint than previously, which results in greater tar combustion and better utilisation of the energy in the degasified components. Furthermore, a packing material is described that contains a component containing carbon and that also contains particles containing silicon oxide in a homogeneous mixture with the component containing carbon. The component containing carbon can be a granulate such as pellets of a mass that comprises dust containing carbon and a binder of tar/pitch. The dust containing carbon in the mass can be made up of butt filter dust which contains sodium and fluorine. The mass can also contain a powder/dust of a material containing silicon oxide such as crushed, ground chamotte stone. The present invention results in that materials/substances currently dumped, now can be reused for the baking of carbon bodies within the aluminium industry.

10 Claims, No Drawings

METHOD FOR BAKING OR CALCINATION OF SHAPED CARBON BODIES IN A FURNACE

The present invention concerns a procedure for baking or calcination of shaped carbon bodies in a ring chamber furnace and a packing material for use in the same.

When baking or calcining shaped carbon bodies such as anodes for the electrolysis of aluminium, shaped (green) carbon is placed in a furnace chamber. For baking, a packing material is used to support the carbon bodies in the furnace chamber in order to avoid shape deviations. The packing material will also absorb volatile components which are separated from the carbon during baking and be sacrificial material in connection with oxidation caused by air which diffuses in so that there is no burn-off of air on the anodes.

Coke, or packing coke, is today the most widespread packing material in connection with calcination of anodes for use in the aluminium industry. Coke can, for example, be produced in connection with the distillation of crude oil (petroleum coke).

NO patent 77.619 states that mixtures of coke ballast and bauxite powder, graphite, anthracite and clay soil can be used as a filling powder when baking carbon bodies. A further indication of weight ratios, etc. is also given.

DE 2.314.391 concerns a procedure for baking carbon bodies which are covered by packing coke in which the packing coke is also covered by a layer of fire-resistant material. The packing coke and the fire-resistant material have different particle sizes in order to avoid the two materials becoming mixed. The layer of fire-resistant material is to counteract the oxidation of the packing coke and may consist of sintered chamotte spheres, among other things.

A disadvantage of using coke as the packing material is that slagging can easily occur in the upper part of the cassette walls in the furnace as a result of the fact that, during calcination, the packing material used produces a relatively small temperature gradient across the packing joint and has a high content of carbon (carbon surplus). Another disadvantage of using coke as packing material, possibly mixed with other materials as stated above, is that it involves a consumption of valuable raw materials which can be used for anode production.

The present invention concerns a method and a packing material for use in connection with baking carbon bodies which is mainly based on the reuse of materials and in which the above problems of slagging can be reduced. In accordance with the present invention, a packing material with a lower thermal conductivity than other known packing materials is used, which produces a greater temperature gradient across the packing joint and greater combustion of volatile components. This results in better utilisation of the energy in the degasified components and less tar is produced during baking. Furthermore, it has been shown that the composition of the packing material has made it possible to use contaminated carbon dust.

Replaced stones of fireproof material (chamotte) from ring chamber furnaces which have been repaired or which have been rewalled represent a waste problem in connection with the calcination of carbon bodies as stated in the above. Such rewalling usually takes place at intervals of some years or otherwise as required. In addition, there is continuous replacement of stone in connection with general maintenance. The quantity of fireproof materials repaired is typically 1–2% of the production volume in a furnace. Thus considerable quantities of stone are replaced. This stone is usually dumped.

Chamotte stone which is crushed to the appropriate particle size has proved to be suitable as a component in packing material as this component has low thermal conductivity. Chamotte stone also contains large quantities of silicon and crushed chamotte stone used as a packing material has been shown to have good properties with regard to the absorption of contaminants present in, for example, butt filter dust.

Approximately 5–10% fine carbon dust is produced from the quantity of coke purchased annually. The majority of this dust cannot today be recycled or used. This is because the dust is difficult to handle and partly because the contaminants in the dust make it unsuitable for recycling in anodes. At this moment, the dust is dumped. In the future it will probably become more expensive to dump it and the legislation governing the dumping of waste will probably become stricter. Therefore, it is not possible to base plans on the continued dumping of large quantities of carbon dust.

It is desirable to be able to convert the current carbon by-products into raw materials. If the dust were reused, the result would be better carbon production economy as well as better resource management. At the same time, major negative impacts on the environment could be avoided.

A great deal of the dust comes from crushing butts from the electrolysis process. The anode remnants or butts contain contaminants from the electrolysis bath which it is undesirable to return to, for example, the anode mass in the form of dust. If butts are recycled for anodes, they must be carefully cleaned before use, i.e. that part of the butts which contains contaminants from the bath must be removed. It has been shown that if the anode mass has too high a content of sodium during baking, sodium can diffuse out from the anode in the baking process and change the physical properties of the fireproof stone in the cassette walls. Furthermore, the quality of the anodes will be reduced if they contain bath components.

If the dust could be converted into another, easier-to-handle form and the contaminants could be made harmless, it would be possible to recycle the waste. If the dust and a binder are pelletised, the speed of the sodium diffusion is reduced considerably. Furthermore, by using a packing material in the appropriate particle size which contains silicon oxide ($SiO_2$), it has been found that contaminants in the packing material's carbon component react with the silicon oxide in the packing material and, to an insignificant degree, with the fireproof stone in the furnace. The dust does less damage in this form and the mass which is pelletised can also contain an additive of powder/dust containing silicon oxide in addition to the carbon dust. The additive contributes to binding the sodium in the pellets so that they can further prevent sodium diffusing out and damaging the cassette walls.

The waste gases in connection with baking anodes in an anode factory contain tar vapours which can be collected in an electrofilter. Tar also represents a by-product which cannot directly be used in production. Tar has been shown to be a suitable binder for the manufacture of pellets based on carbon dust. With the present procedure and packing material, solutions have been arrived at which make it possible to use waste products, in particular from the aluminium industry, which today are mainly dumped.

The present invention thus concerns a method and a packing material for use in connection with baking carbon bodies, which are mainly based on the reuse of materials.

The present invention is characterised in that it includes the use of a homogeneous mixture of a material containing silicon oxide and a material containing carbon in connection with baking carbon bodies.

The material containing silicon dioxide is preferably shaped to form a particle size of 6–25 mm.

The packing material preferably contains approximately 85 weight % of particles containing silicon dioxide and approximately 15 weight % of material containing carbon.

Preferably, the material containing a silicon dioxide is particles formed of crushed chamotte stone.

Preferably, the material containing carbon is formed by mixing carbon dust with a binder and granulating the resultant mixture. The mixture may also contain a powder/dust which contains silicon dioxide.

The material containing carbon is preferably formed by grinding residual material containing carbon returned from manufacture of aluminium, to dust, mixing the dust with a binder and granulating the resultant mixture to form pellets.

The residual material containing carbon can be contaminated by sodium, and possibly fluorine.

The present invention, which will be described in further detail below using examples, involves particles containing silicon oxide being mixed with a material containing carbon to form a finely distributed, homogeneous mixture for use as a packing material in connection with baking or calcining shaped carbon bodies.

The material containing silicon oxide which is used in accordance with the present invention is crushed to a given particle size and mixed with a packing material containing carbon using a mixing machine. As the thermal conductivity of the packing material in accordance with the present invention is lower than, for example, petroleum coke, baking of carbon bodies will now take place at a greater temperature gradient across the packing joint than previously, which results in greater tar combustion. By increasing the furnace's own combustion of tar vapours, the quantity of tar discharged into the purification plant can be reduced.

The material containing carbon which is used in accordance with the present invention can also comprise material containing carbon which has had contact with an electrolysis bath, such as anode remnants (butts), and which consequently contains bath components such as sodium (Na) and fluorine (F). Normally, an attempt will be made to avoid the introduction of the above contaminants in a furnace as bath components which come into contact with fireproof materials in the anode furnace will have a corrosive effect on them and will contribute to reducing the service life of the furnace. However, the presence of material containing silicon oxide in particle form, for example crushed and used chamotte stone, acts like a "sacrificial material" so that the corrosive effect of Na and F on the fireproof materials in the anode furnace is very much reduced.

The material containing silicon oxide in the form of crushed chamotte forms part of the packing material as an evenly distributed component and has, at the same time, fractured surfaces which are more reactive with regard to diffusion than the surfaces of the fireproof stone in the furnace. This contributes to the fact that the Na and F from the packing material's carbon component and from the butts added to the anodes will react and bind with the chamotte in the packing material instead of forcing their way out to the cassette walls in the furnace. The ratio between the chamotte stone and the material containing carbon can be adjusted depending on the need for "sacrificial material" and the desire to recycle carbon dust. Thus the carbon percentage can be 15–99.9% of the mixture.

Chemical reactions between components in the chamotte and bath components will be explained in further detail under the description of the packing material.

The evenly distributed component containing silicon oxide in the packing material has thus made it possible for contaminated carbon material to be used during the baking of shaped carbon bodies. In this connection, it should be mentioned that the material containing carbon is best in granulated form as pellets of size 5–8 mm and can be formed of a mass consisting of carbon dust or carbon particles mixed with an appropriate binder.

The following examples illustrate a design in accordance with the present procedure. Chamotte stone is crushed to 6–25 mm and mixed with a granulate of material containing carbon which consists of pellets of diameter 5–8 mm and length 5–15 mm so that the chamotte makes up 85% of the weight of the mixture and the pellets the remaining 15%. The pellets can be produced from a mass of waste products containing carbon which are returned from the manufacture of aluminium. It should be understood that other products containing carbon such as packing coke (5–12 mm) can also be used in the mixture. An example of the manufacture of pellets will be given in the description below of an embodiment in accordance with the present invention.

If pellets in a green state are used as the material containing carbon, the pellets will be calcined during the baking of the anodes. When the baking of the anodes has been completed, an appropriate quantity of green pellets, for example the quantity consumed during baking, is placed on the top of the chamber. Subsequently, the packing material is sucked out of the furnace and collected in a container. The green pellets will thus be mixed in and baked in the next round.

A preferred embodiment of the packing material will be explained in the following:

Chamotte stone crushed to 6–25 mm is mixed with a granulate of material containing carbon so that the chamotte makes up 85% of the weight of the mixture and the granulate the remaining 15%. The granulate can be made up fully or partially of pellets that are manufactured from a mass of waste products containing carbon returned from the manufacture of aluminium. The mass also contains a binder and possibly a powder/dust of a material containing silicon oxide. This powder/dust can be made up of crushed, ground chamotte stone. It is appropriate to add the latter if there are waste products containing carbon such as butt filter dust in the mass. The granulation can take place in a known manner by passing the mass through a pellet press to produce pellets with a size of 5–8 mm. Organic, carbon-based binders such as pitch (petroleum pitch or coal tar pitch) and tar collected, for example, during the baking of anodes can be used as the binder. Furthermore, some oil (waste oil or diesel) may be added to improve the extrusion properties of the mass if it contains chamotte powder/dust.

The extrusion properties also depend on the content of binder, but it is important that the quantity of binder is not too high as, otherwise, the pellets can stick together during baking and are thus difficult to suck out of the furnace after the baking process. The addition of oil has a lubricating effect during extrusion so that the pellet press can work with masses which have lower contents of binder. The oil evaporates early during the baking of the pellets and the remaining quantity of pitch/tar is so low that adhesion is avoided.

Typical values for the individual components in the mass can be: carbon dust 70–74% weight, chamotte powder/dust 3–15% weight, binder 15–18% weight and oil 0–6% weight.

If the material containing carbon which is to be used contains contaminants of a type such as sodium (Na) and fluorine (F), which are, for example, present in butt filter dust, the portion of chamotte particles in the packing material will contribute to the Na and F being rendered harmless. Furthermore, an added percentage of chamotte in the form of powder or dust in the mass will further contribute to the contaminants being rendered harmless. The silicon oxide in the chamotte binds the catalytic contaminants in the butt filter dust so that the Na and F will react and bind with the chamotte in the pellets and in the packing material instead of forcing their way out to the cassette walls in the furnace. As stated in connection with the description of the method in accordance with the invention the addition of chamotte acts as a "sacrificial material" for the catalytic contaminants. Tests which have been carried out have shown that the pellets' reactivity with regard to $CO_2$ and air is considerably reduced when chamotte dust is added. Low reactivity is desirable to achieve less consumption of packing material and thus less loss of volume, which is important with regard to supporting the carbon bodies during baking.

Of the catalytic contaminants in the butt filter dust which can be expected to affect the reactivity of the packing material, Na is the most important as it is present in the most dominant quantity.

It is assumed that it is silicon oxide which inhibits Na's catalytic abilities by forming heavy, inhibiting complexes. From standard tables (the JANAF tables were used here) it has been found that the following equilibria can appear at the temperatures in question:

| | | | |
|---|---|---|---|
| $SiO_2$ (s) + | $Na_2O$ (s) = | | $Na_2SiO_3$ (s) |
| $2SiO_2$ (s) + | $Na_2O$ (s) = | | $Na_2Si_2O_5$ (s) |
| $2SiO_2$ (s) + | Na (s) + | 1/2O (g) = | $Na_2SiO_3$ (s) |
| $2SiO_2$ (s) + | 2Na (s) + | $1/2O_2$ (g) = | $Na_2Si_2O_5$ (s) |

In general, it can be said that the formation of sodium silicates is assumed. When using chamotte as a material containing silicon oxide, it is also possible to imagine the formation of Na—Al silicates as chamotte also contains $Al_2O_3$. All the reactions have in common that the highly reactive sodium loses its catalytic abilities in that it becomes "too heavy" (forms part of complexes).

Fluorine does not catalyse air burn-off on carbon materials as Na does, but in connection with diffusion into fireproof material it is known that fireproof components are formed with low melting points (slag). The chamotte particles in the packing material will then be able to function as a sacrificial material for fluorine, thus sparing the cassette walls.

The packing material in accordance with the present invention makes it possible for materials containing carbon such as carbon dust, butt filter dust, etc., which represent by-products from the production of aluminium, now to be used as a component in the packing material in connection with baking carbon bodies without there being any risk of rapid breakdown of the cassette stones in the furnace. The chamotte particles which are mixed with the pellets further contribute to give the packing material good mechanical properties with regard to supporting the carbon bodies during baking, at the same time as a greater temperature gradient across the packing joint is achieved as a result of the packing material having a lower thermal conductivity.

We claim:

1. A method for treating shaped carbon bodies in a furnace with one or more individual chambers designed to receive carbon bodies, which comprises packing a packing material containing carbon between the carbon bodies and the walls of the individual chambers in a manner to support the carbon bodies, wherein the packing material is formed by mixing a material containing silicon dioxide with a material containing carbon to obtain a mixture, the mixture is homogenous, the material containing carbon represents 15–99.9 weight % of the mixture, the material containing silicon dioxide is shaped to a particle size that contributes to physical support of the carbon bodies under the baking process, and the furnace is a fired calcining furnace baking or calcining the carbon bodies and recovering the baked or calcined carbon bodies from the furnace.

2. A method in accordance with claim 1, wherein the material containing silicon dioxide is previously used refractory material.

3. A method in accordance with claim 1, wherein the fired calcining furnace is a ring chamber furnace.

4. A method in accordance with claim 1, wherein the material containing silicon dioxide is shaped to form a particle size of 6–25 mm.

5. A method in accordance with claim 1, wherein the packing material contains approximately 85 weight % of particles containing silicon dioxide and approximately 15 weight % of material containing carbon.

6. A method in accordance with claim 1, wherein the material containing silicon dioxide is particles formed of crushed chamotte stone.

7. A method in accordance with claim 1, wherein the material containing carbon is formed by mixing carbon dust with a binder and granulating the resultant mixture.

8. A method in accordance with claim 1, wherein the material containing carbon is formed by grinding residual material containing carbon returned from manufacture of aluminium, to dust, mixing the dust with a binder and granulating the resultant mixture to form pellets.

9. A method in accordance with claim 8, wherein the residual material containing carbon is contaminated by sodium.

10. A method in accordance with claim 9, wherein the residual material containing carbon is further contaminated by fluorine.

* * * * *